May 15, 1923.

W. WILLIAMS

AMUSEMENT DEVICE

Filed Nov. 10, 1920

1,454,991

INVENTOR
Winfield Williams
BY John A. Naismith
ATTORNEY

Patented May 15, 1923.

1,454,991

UNITED STATES PATENT OFFICE.

WINFIELD WILLIAMS, OF SAN JOSE, CALIFORNIA, ASSIGNOR TO J. F. PATTERSON AND HORTENSE BEAN, A COPARTNERSHIP OPERATING AS PATTERSON-WILLIAMS MFG. CO., OF SAN JOSE, CALIFORNIA.

AMUSEMENT DEVICE.

Application filed November 10, 1920. Serial No. 423,163.

*To all whom it may concern:*

Be it known that I, WINFIELD WILLIAMS, a citizen of the United States, and resident of San Jose, in the county of Santa Clare and State of California, have invented certain new and useful Improvements in Amusement Devices, of which the following is a specification.

My invention relates to an amusement device for children, and I have embodied in this device some of the characteristics of a child's vehicle. It is the object of my invention to provide a device of the character indicated that is freely movable within a restricted area, and that is simple in form and construction and economical to manufacture, and particularly adapted for the entertainment of small children.

In the drawing:—

Figure 1:
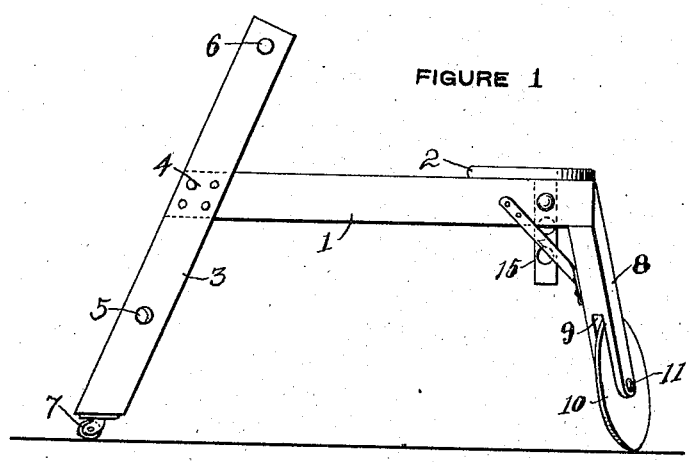
Figure 1 is a side elevation of the device embodying my invention.
Figure 2:
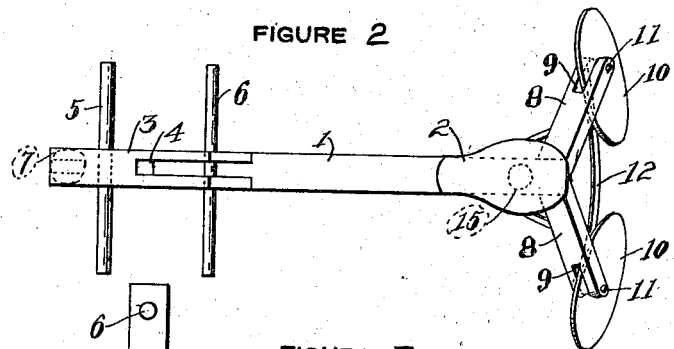
Figure 2 is a plan view of the same.

Referring more particularly to the drawing, 1 indicates a horizontal bar fitted with a seat 2. A front leg member is shown at 3 mounted in angular relation to bar 1 and secured thereto by a mortise and tennon joint at 4, the leg 3 being fitted with foot supports at 5, a handle at 6, and a caster wheel at 7.

Extending outwardly, downwardly and to a slight degree rearwardly from the rear end of bar 1 are two rear leg members 8—8. Each leg member is forked as at 9 and fitted with a wheel 10 held in position by and rotating upon a bolt 11. A brace 12 is shown extending from one bolt 11 to the other to strengthen the structure. This rear end structure embodying parts 8—9—10—11—12 is arranged and constructed so that the wheels 10—10 travel in a circle of which the caster wheel 7 forms the center. In the present instance the wheels 10—10 are also inclined outwardly from the vertical axis of the caster 7.

A device of this kind is particularly adapted for use in a restricted space as in a room, on a porch, etc., since it cannot be easily moved from a given position without picking it up bodily and carrying it to another position. This result is effected particularly by the form and arrangement of the rear end of the structure. A movement forward or backward can be effected only by slipping or sliding wheels 10—10 on the floor, a difficult thing for a child to accomplish. A lateral movement of the whole device is equally difficult for a child to effect since much more effort is required to move caster 7 than wheels 10—10. Since the seat 2 is located near wheels 10—10 a slight shove with a foot upon the floor to either side of the device will readily cause the wheels 10—10 to roll in the opposite direction, but since practically no lateral pressure is brought upon caster 7 the wheels 10—10 are caused to move in a circle about it as a pivot. This circular movement of the rear end of the structure is facilitated by the inclination of the wheels 10—10 and by the fact that the said wheels are inclined with relation to each other so that one will travel in the track of the other which ever direction the rear end moves.

Figure 3:
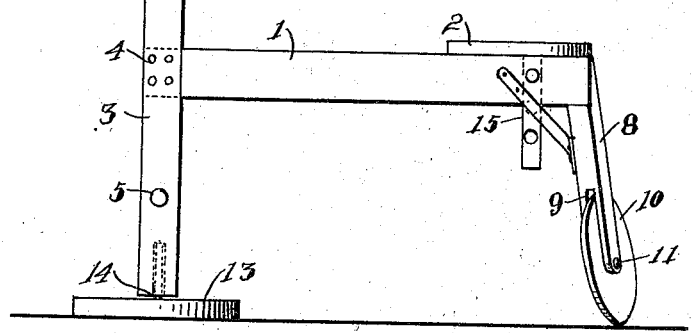
Figure 3 is a side elevation of another embodiment of my invention.

By providing the caster 7 as described a little movement of the front leg 3 is permitted. The essential elements of the invention, however, may be embodied in a structure such as shown in Figure 3. In this embodiment a plate 13 is provided and the leg 3 is arranged vertically and pivoted upon plate 13 as shown at 14. In this form substantially the same results are obtained as set forth in connection with the preferred embodiment above described but, of course, the device is anchored to a given position while the preferred form may be said to be hobbled.

A toy of this kind is particularly desirable for young children as it can be used freely in the house with but little danger of injuring other furniture therein, and if used out of doors it prevents wandering of the child as is common with the devices of a similar nature such as the various well known kinds of child's vehicles. The seat is adjustable at 15 for children of different ages.

It is to be understood, of course, that the above disclosure of the invention is to be considered as illustrative only and in no way to be construed as limiting the scope of the invention as set forth in the appended claims.

I claim:—

1. A device of the character indicated comprising a supporting member, a swivelling wheel mounted thereon, a seat member mounted at one end on said supporting member, a seat thereon facing said supporting member, and revoluble means adapted to travel in a circular path about the vertical axis of said swivelling wheel operatively mounted to support the other end of said seat member.

2. A device of the character indicated comprising a supporting member, a swivelling wheel mounted thereon, a seat member mounted at one end on said supporting member, and a plurality of wheels arranged to support the other end of said seat member and inclined outwardly and downwardly from the vertical axis of said swivelling wheel, and arranged one behind the other to travel in a circular path about the vertical axis of said swivelling wheel, and a seat arranged adjacent said wheels and facing said axis.

3. An amusement device comprising a horizontal frame member, a freely and bodily movable front leg member supporting one end of the frame member, a pair of downwardly and rearwardly divergent rear legs supporting the frame member and having their lower ends forked, a wheel disposed in each forked end of the rear legs in a plane tangential to an arc drawn from the front supporting leg, axles journalling the wheels in the respective forked ends, and a brace connecting the axles.

4. An amusement device comprising a horizontal frame member, a forwardly and downwardly inclined front leg supporting the same at one end and extending thereabove for carrying a handle, a seat facing the leg and supported on the opposite end of the frame member, and a wheel supporting the latter end of said member for movement only transversely of the seat.

5. An amusement device comprising a horizontal frame member, a front leg member supporting one end thereof, a caster wheel mounted on the lower end of the front leg, and a pair of wheels supporting the opposite end of the frame member, said wheels being mounted for movement in a direction transverse of the frame member.

WINFIELD WILLIAMS.